United States Patent
Anthes et al.

(10) Patent No.: US 6,490,765 B2
(45) Date of Patent: Dec. 10, 2002

(54) BAND FOR A HOSE CLAMP

(75) Inventors: Steffen Anthes, Langen (DE); Willi Stichel, Maintal (DE); Gerhard Wachter, Büdingen (DE); Stephan Mann, Bieber (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/967,214

(22) Filed: Sep. 27, 2001

(65) Prior Publication Data
US 2002/0038495 A1 Apr. 4, 2002

(30) Foreign Application Priority Data
Oct. 4, 2000 (DE) .......................... 100 48 955

(51) Int. Cl.[7] .............. B65D 63/00; F16B 7/00; F16L 33/04
(52) U.S. Cl. ................ 24/279; 24/280; 24/284
(58) Field of Search ............ 24/279, 280, 281, 24/284, 282, 305, 495; 285/410; 411/41

(56) References Cited

U.S. PATENT DOCUMENTS

| | | | | |
|---|---|---|---|---|
| 1,641,559 A | * | 9/1927 | Thompson | 24/279 |
| 2,842,385 A | * | 7/1958 | Webster et al. | 24/279 |
| 2,874,440 A | * | 2/1959 | Kalikow et al. | 24/279 |
| 3,565,468 A | * | 2/1971 | Garrett | 24/279 |
| 4,299,012 A | * | 11/1981 | Oetiker | |
| 4,521,940 A | * | 6/1985 | Oetiker | |
| 5,010,626 A | * | 4/1991 | Dominguez | 24/279 |
| 5,170,540 A | * | 12/1992 | Oetiker | 24/284 |
| 5,299,344 A | * | 4/1994 | Oetiker | 24/284 |

FOREIGN PATENT DOCUMENTS

| | | | |
|---|---|---|---|
| DE | 1717978 | * | 5/1956 |
| DE | 8432519 | * | 7/1985 |
| DE | 3710852 | | 3/1988 |
| DE | 3729372 | | 9/1989 |
| DE | 3926626 | | 10/1990 |
| DE | 3521903 | * | 5/1992 |
| DE | 4309565 | * | 9/1994 |
| DE | 198 00 283 C1 | | 7/1999 |
| DE | 198 22 915 C1 | | 9/1999 |
| EP | 0777075 | * | 6/1997 |
| EP | 0730117 | | 4/2001 |
| FR | 472891 | * | 6/1914 |

* cited by examiner

*Primary Examiner*—Victor Sakran
(74) *Attorney, Agent, or Firm*—Friedrich Kueffner

(57) ABSTRACT

A steel band for a hose clamp has a main body and at least one pair of end portions, wherein each one of the end portions has at least one slotted hole receiving a clamping screw with a screw head. The end portions are bent to form loops. Each loop has first and second legs. First and second clamping members are inserted into the loops, respectively. The first and second clamping members have a substantially cylindrical periphery. The first clamping member has a transverse bore without thread receiving a threaded shaft of the clamping screw allowing free movement of the threaded shaft. The second clamping member has a transverse threaded bore engaging the threaded shaft of the clamping screw. The first and second legs are connected to one another near the free end of the first leg by a positive-locking connection.

8 Claims, 3 Drawing Sheets

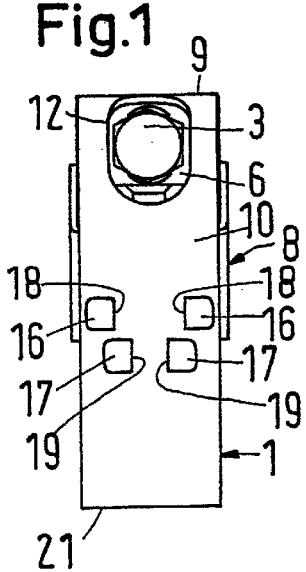
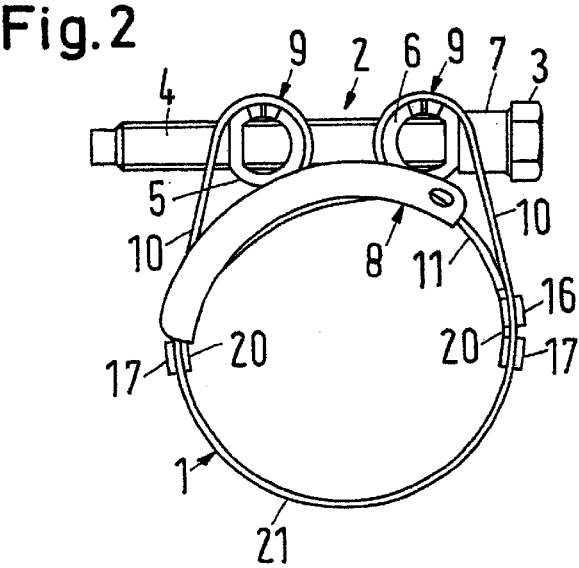
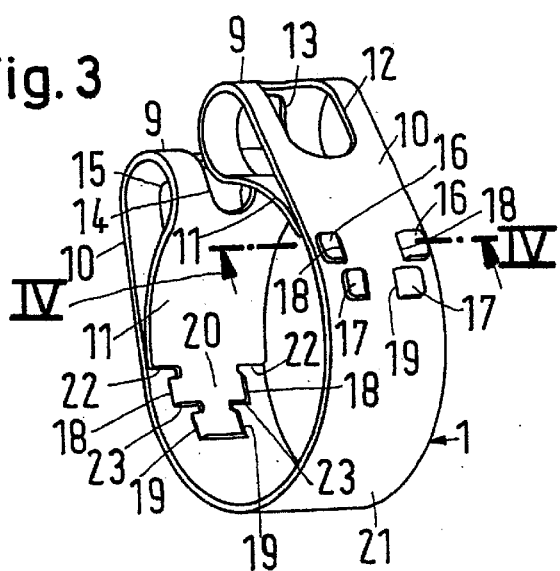
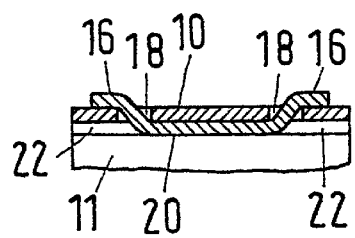
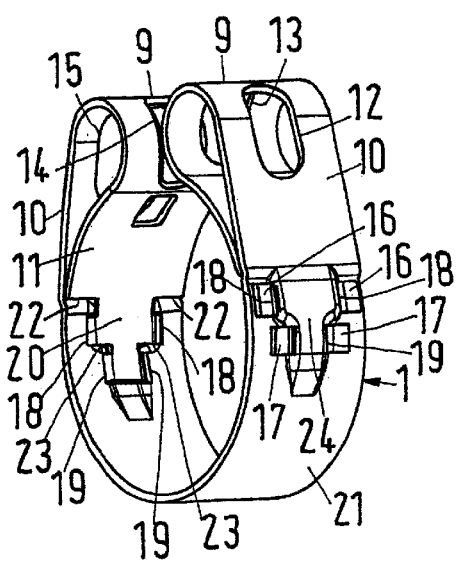
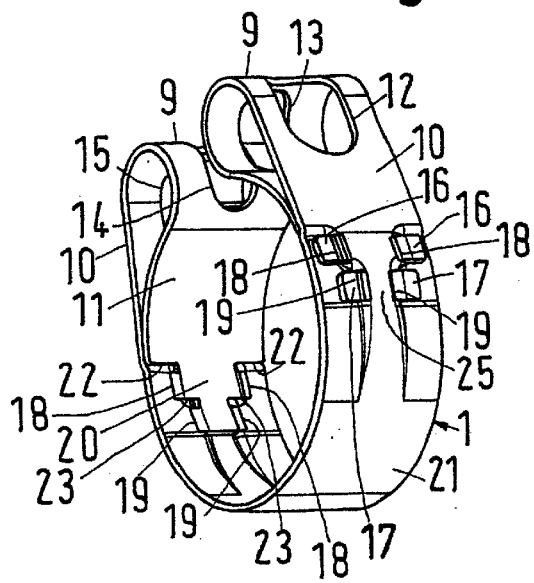

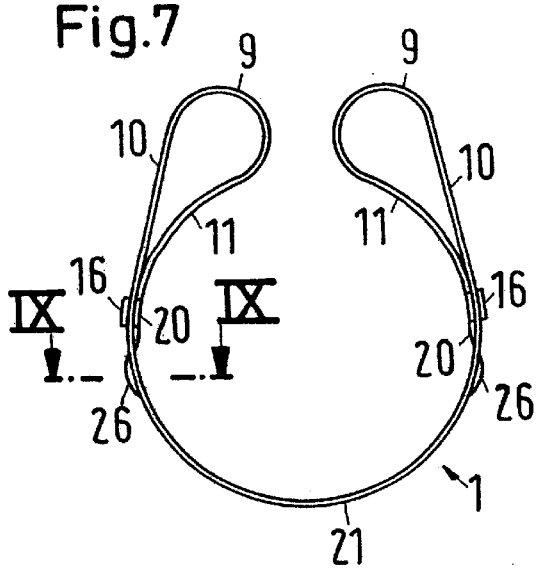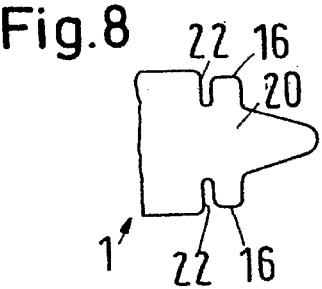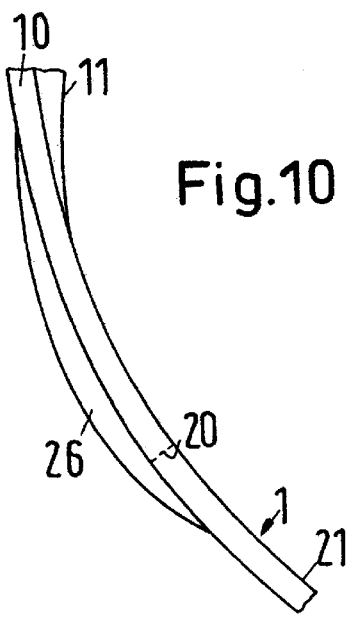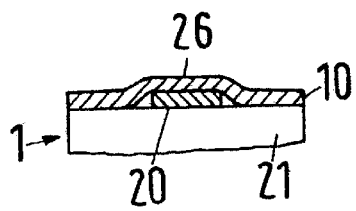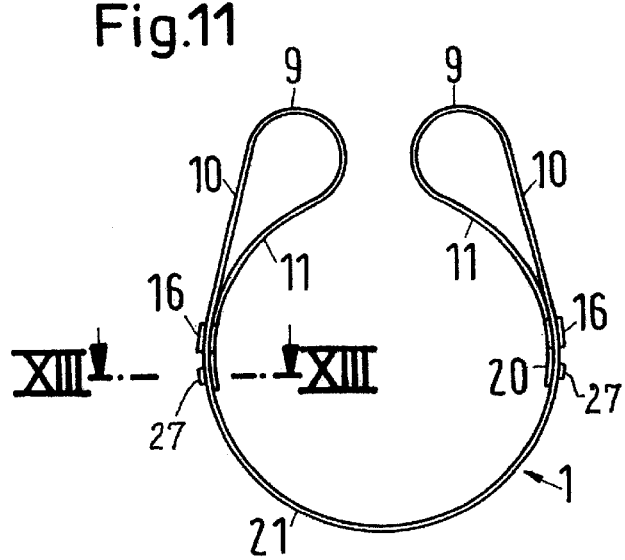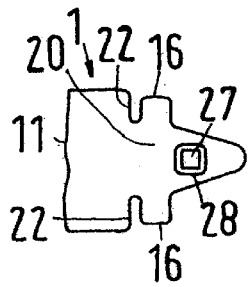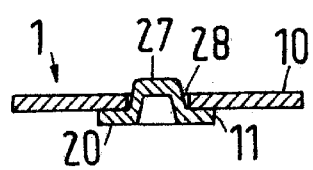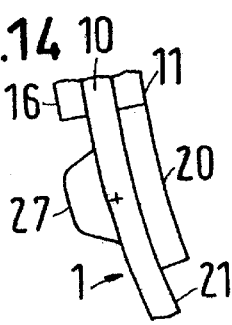

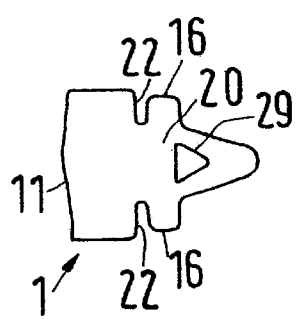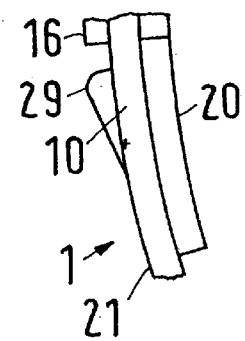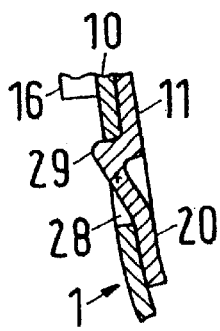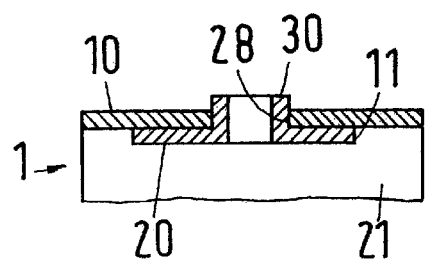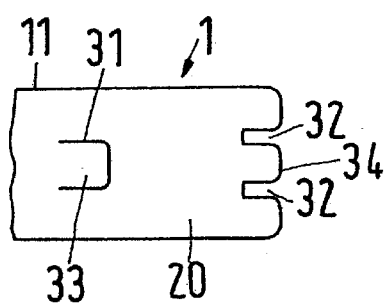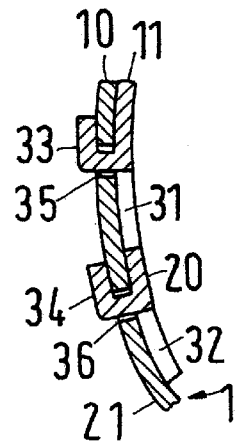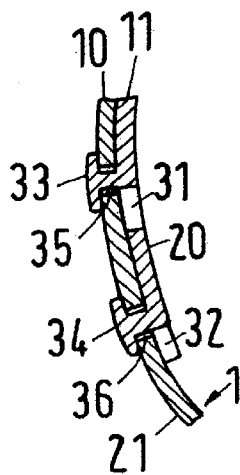

BAND FOR A HOSE CLAMP

BACKGROUND OF THE INVENTION

1. Field of the Invention

The invention relates to a steel band for a hose clamp, the steel band comprising at least one pair of end portions which are provided with at least one closed longitudinal slot for guiding therethrough a clamping screw having a head and are bent to form loops. The legs of each loop, in the vicinity of the free end of one leg, are connected to one another and are provided for receiving one of two clamping members, respectively, which clamping members, at least over a portion of their periphery, are cylindrically shaped. One of the clamping members has a transverse opening without a thread for freely guiding therethrough the threaded shaft of the clamping screw, and the other clamping member has a transverse opening with a thread for engaging the threaded shaft of the clamping screw.

2. Description of the Related Art

In such a band for a hose clamp of the aforementioned kind as disclosed, for example, in any of the German patents DE 198 22 915 C1, DE 37 29 372 C2, DE 37 10 852 C1, DE 198 00 283 C1 or the German published patent application DE 39 26 626 A1, the legs of the loop are connected to one another by spot welding. In order to be able to manufacture such a welding connection in a permanent way, the band 1 for a hose clamp is comprised of stainless steel. Stainless-steel is an expensive material. In spite of this, there is still the risk of corrosion at the welding locations. A pre-galvanized band for a hose clamp which is, for example, coated with an alloy of aluminum and zinc, would be less expensive. However, a band for a hose clamp which is treated in this way cannot be welded.

SUMMARY OF THE INVENTION

It is an object of the present invention to provide a band for a hose clamp of the aforementioned kind which, while providing high stability under load of the loops in response to the clamping forces, can be manufactured less expensively and more easily.

In accordance with the present invention, this is achieved in that the connection of the legs of each loop is a positive-locking connection.

With such a configuration of the connection it is no longer necessary to employ welding. Also, it is no longer necessary to use stainless steel for the steel band. Instead, low-grade, inexpensive steel can be used which can be made corrosion-resistant by providing a coating.

The positive-locking connection of the legs of the loop can be realized in a simple way in that one leg of the loop is provided with projections projecting away from the plane of that one leg, wherein the projections project into holes of the other leg of the loop, and in that the one leg having the projections of each loop rests against the radially inner side of the band for a hose clamp in an area of the band forming a substantially circular clamp portion. In this connection, the holes can be produced simultaneously with the band for a hose clamp being cut to size from a longer material band by stamping. The projections can be formed in a simple way out of the band for a hose clamp and can be inserted into the holes. The end portion of the radially inner leg of the loop provided with the projections is then pressed during tightening of the hose clamp against the. inner side of the other leg of the loop. This provides an additional frictional connection between the legs of the loop which increases the stability and strength of the connection of the legs of the loop..

Preferably, it is ensured that one leg of each loop is provided with tabs cut out of the band for a hose clamp and bent out of the plane of that one leg, which tabs project through the holes of the other leg of the loop and are bent onto one side of the other leg of the loop. In this connection, producing the tabs and the holes can be carried out simultaneously with the step of cutting to size the band for a hose clamp from the longer material band by stamping. The connection of the tabs and the holes with a corresponding deformation of the tabs can also be realized in a simple way as known and conventional in the art.

Moreover, it is beneficial when at least one pair of tabs is provided whose tabs are bent in opposite directions relative to one another in a direction away from the longitudinal center axis of the band for a hose clamp to the longitudinal edges of the band for a hose clamp. In this configuration the tabs are then loaded as a result of resting against the edges of the holes only by transverse forces and not by bending stress. The positive-locking connection in this way can withstand even higher loads.

Preferably, it is ensured that the holes are wider transverse to the longitudinal direction of the band for a hose clamp than the band for a hose clamp is thick and that the tabs of each pair of tabs extend at a slant to the plane of the band from their base to the side of the leg onto which they are bent. In this configuration, a relatively large contact surface area between the edges of the holes and the tabs is provided in comparison to a configuration in which the edges of the holes and the tabs are crossing, one another at a right angle.

A further advantageous configuration resides in that each of the end portions of the legs of the loop provided with tabs is cut back to a reduced width in comparison to the main body of the band for a hose clamp up to the base of the tabs so that the band for a hose clamp has transverse edges and so that in a center plane of the band for a hose clamp perpendicular to the plane of the band, in the vicinity of the holes of each hole pair receiving a tab pair, a concave bead extends in the longitudinal direction of the band for a hose clamp. A backwardly bent end of the leg of the loop engages in a flush arrangement the hollow space of the bead. In this connection, a substantially continuous transition between the transverse edges of the end portion of the radially inwardly positioned leg of the loop having the tabs and the inner side of the remainder or main body of the band for a hose clamp is provided. When using a hose clamp provided with a band according to the invention for securing a hose on a pipe socket, the risk of a step-like transition of the inner diameter of the clamp hose occurring in the area of the transverse edges is substantially prevented so that a substantially uniform clamping force exerted by the clamp is realized about the circumference of the hose and, accordingly, a high sealing action of the connection between the hose and the pipe socket is ensured. At the same time, damage to the hose by such edges is prevented.

This configuration can be embodied in such a way that the bead extends between the holes of each pair of holes receiving a pair of tabs and that the material of the radially outer leg of the loop, when the band for a hose clamp is formed to the hose clamp, projects radially inwardly relative to the contour of the bead and the hose clamp in an area adjacent to the longitudinal sides of the bead, wherein the material of the outer leg of the loop projects at the transverse edges by the thickness of the band for a hose clamp and from these transverse edges, when viewed in the longitudinal direction of the bead, projects with a decreasing amount up to the contour of the bead.

An embodiment that is especially advantageous and long-lived comprises at least one of the projections embodied in the form of a rim hole which is riveted or upended at the side of the other leg.

As an alternative, the projections can be cup-shaped or nose-shaped and/or the projections can be the tabs.

BRIEF DESCRIPTION OF THE DRAWING

In the drawing:

FIG. 1 is a side view of the hose clamp with a band for a hose clamp according to the invention;

FIG. 2 is an axial view of the hose clamp according to FIG. 1;

FIG. 3 is a perspective view of the band for a hose clamp according to FIG. 1;

FIG. 4 shows a section view along the section line IV—IV of the band for a hose clamp according to FIG. 3 on an enlarged scale;

FIG. 5 is a variant of the embodiment of the band for a hose clamp according FIGS. 1 through 4;

FIG. 6 is. another variant of the embodiment of the band for a hose clamp according FIGS. 1 through 4;

FIG. 7 is yet another variant of the embodiment of the band for a hose clamp according FIGS. 1 through 4;

FIG. 8 is a plan view on an enlarged scale onto the end portion of a leg of the loop of the band for a hose clamp according to FIG. 7 in the not yet deformed state;

FIG. 9 shows a section along the section line IX—IX of the band for a hose clamp according to FIG. 7 on an enlarged scale;

FIG. 10 is a detail side view of the hose clamp according to FIG. 7;

FIG. 11 is a further variant of the hose clamp according to FIGS. 1 through 4;

FIG. 12 shows an enlarged plan view onto an end portion of a leg of the loop of the band for a hose clamp according to FIG. 11 with a formed projection before deforming the tabs;

FIG. 13 shows a section along the section line XIII—XIII of FIG. 11 on an enlarged scale;

FIG. 14 shows a detail of a side view of the band for a hose clamp according to FIG. 11;

FIG. 15 shows a further variant of the end portion illustrated in FIG. 12;

FIG. 16 shows a detail of a side view of the band for a hose clamp illustrating the modification according to FIG. 15;

FIG. 17 shows a longitudinal section of the detail according to FIG. 16;

FIG. 18 shows an enlarged detail view of a longitudinal section of a modification of the band for a hose clamp according to FIG. 11;

FIG. 19 shows an enlarged plan view of a further modification of an end portion, not yet deformed, of a leg of the loop of a band for a hose clamp according to the invention;

FIG. 20 shows an enlarged longitudinal section of the connecting location of the leg of the loop of the band for a hose clamp according to the invention with the end portion according to FIG. 19; and FIG. 21 shows a modification of the connecting location of the leg of the loop according to FIG. 20.

DESCRIPTION OF THE PREFERRED EMBODIMENTS

FIGS. 1 and 2 illustrate a hose clamp which is comprised of: a steel band 1 provided with a corrosion-resistant coating; a clamping screw 2 with a head 3 and a threaded shaft 4; two substantially sleeve-shaped clamping members 5 and 6 which can also be embodied in the form of at least partially cylindrical bolts; a sleeve 7 surrounding the threaded shaft 4 between the head 3 and the clamping member 6; and a flap 8 bridging the gap between the ends of the band 1 for a hose clamp.

The band 1 for a hose clamp has a pair of end portions but, in the case of two halves of a hose clamp connected by two clamping screws, can also have two pairs of end portions. The end portions are bent to a loop 9, respectively, whose legs 10, 11 near the free end of the leg 11 are connected to one another. The loops 9 have two longitudinal slots (slotted holes) 12, 13; 14, 15 that are closed all around and receive the clamping screw 2, respectively. The stays between the slots 12, 13; 14, 15 of each loop 9 can also be omitted so that the loops 9 each have only one slot. The loops 9 surround partially one of the two clamping members 5 and 6, respectively. The clamping members 5, 6 are at least partially cylindrical about their periphery but can also be completely cylindrical. The clamping member 6 has a transversely extending opening or bore (not shown) without thread ("smooth") for freely guiding therethrough the threaded shaft 4 of the clamping screw 2, and the other clamping member 5 has a transverse opening or bore with a thread for engaging the threaded shaft 4.

The connection of the legs 10, 11 of each loop 9 is provided in a positive-locking way. The connection is realized in that one leg 11 of each loop 9 is provided with tabs 16, 17 which are cut out of the plane of the leg 11 and which are bent to form projections which penetrate holes 18, 19 of the other leg 10 of the loop 9 and are bent onto a side of the other leg 10 facing away from the leg 11.

The leg 11 of each loop 9 provided with the tabs 16, 17 rests against the radially inner side of the band for a hose clamp 1 in the area where the main body of the band 1 forms substantially a circular clamp portion 21.

At least one tab pair 16 and/or 17 is provided whose tabs 16, 17 are bent in opposite directions relative to one another in a direction away from the longitudinal center axis of the band 1 for a hose clamp toward the longitudinal edges of the band 1 for a hose clamp.

The holes 18, 19 are wider in a direction transverse to the longitudinal direction of the band 1 for a hose clamp than the band 1 for a hose clamp is thick, and the tabs 16, 17 of each tab pair 16, 17 extend at a slant to the plane of the band 1 for a hose clamp from their base to that side of the leg 10 onto which they are bent; this is illustrated in FIG. 4.

The band 1 for a hose clamp according to FIGS. 1 through 4 can be produced of an inexpensive steel which is coated with a corrosion-resistant coating, preferably an aluminum-zinc-alloy. Since in this case the legs 10, 11 of the loop of the band 1 for a hose clamp cannot be connected to one another by spot welding, they are connected by the tabs 16, 17 and the holes 18, 19 in a positive-locking way.

For several reasons, the positive-locking connection of the legs 10, 11 of the loop according to FIGS. 1 through 4 is at least as highly loadable as a welding connection. For example, the guiding of the tabs 16, 17 from the interior to the exterior through the holes 18, 19 has the advantage that at least the terminal portions 20 of the inner leg 11 of the loop provided with the tabs 18, 19 rest against the inner side of the legs 10 of the loop so that, when clamping or tightening the band 1 for a hose clamp placed about a hose slipped onto a pipe socket for fastening the hose on the pipe socket, the terminal portions 20 are forced against the inner side of the leg 10 and are thus additionally frictionally connected with the legs 10 of the loop. While the inner legs 11 of the loop during tightening of the. band 1 for a hose clamp will adjust tightly to the periphery of the hose, the outer leg 10 of the loop 9 has a tangential transition into the periphery of the main body 21 of the band 1 for a hose clamp, which main body 21 is substantially of a circular shape, and this prevents the positive-locking connection between the tabs 16, 17 and the holes 18, 19 from being radially loaded and thus from lifting the inner leg 11 off the hose which would impair the seal-tightness of the contact area between the hose and the pipe socket. Since the tabs 16, 17 are bent transversely to the longitudinal axis of the band 1 for a hose clamp toward the longitudinal edges of the band 1, they are not loaded by bending stress but only by transverse forces exerted by the edges of the holes 18, 19. The danger of the tabs 16, 17 bending into an open position during tightening of the hose clamp is thus prevented.

The slanted extension of the tabs 16 through the holes 18 (the tabs 17 and the holes 19 are of the same configuration) which are wider than the thickness of the band 1 for a hose clamp, as illustrated in FIG. 4, provides a greater contact surface area between the edges of the tabs 16 and the holes 18, respectively, the tabs 17 and the holes 19, and this, in turn, provides a reduced surface pressure between these edges so that the positive-locking connection can also withstand higher clamping forces for this reason.

The band 1 for a hose clamp according to FIGS. 5 and 6 differs from that in FIGS. 1 through 4 in that a bead 24, 25 is provided between the holes 18, 19 of each pair of holes 18, 19 receiving the pair of tabs 16, 17, the bead 24, 25 extending in the longitudinal direction of the band 1 for a hose clamp. The material of the radially outer leg 10 of the loop 9, when the band 1 for a hose clamp is formed to the hose clamp, projects radially inwardly adjacent to the longitudinal sides of the respective bead 24 or 25 relative to the contour of the bead 24 or 25 and of the band 1 for a hose clamp. At the transverse edges 22, 23, the material of the radially outer leg 10 projects radially by an amount of projection corresponding to the thickness of the band 1 for a hose clamp and from these transverse edges 22, 23 it projects with a decreasing amount of projection in the longitudinal direction of the bead 24 or 25 up to the contour of the bead 24, 25 and the band 1.

The bands 1 of the hose clamp according to FIGS. 5 and 6 differ only with respect to the configuration of the beads 24 and 25. Accordingly, the bead 24 within the band 1 for a hose clamp according to FIG. 5 is configured in such a way that the material of the band 1 for a hose clamp in the area of the bead 24 and in the area adjoining the bent portion into the free end of the loop 9 of the leg 10 is radially outwardly deformed, while the material of the band 1 for a hose clamp according to FIG. 6 laterally adjacent to the bead 25 is radially inwardly deformed. In this connection, the band 1 for a hose clamp according to FIG. 5 maintains adjacent to the bead 24 its circular shape, while the band 1 for a hose clamp according to FIG. 6 adjacent to the bead 25 has a continuous transition from the transverse edges 22, 23 into the circular shape of the main body 21. In both cases, the bead 24 or 25 receives the terminal portion 20 in its hollow space.

This configuration of the band 1 for a hose clamp according to FIG. 5 and FIG. 6 has the advantage that the inner surface of the hose clamp outside of the gap between the free ends of the loops has substantially a continuous cylinder shape so that the radial clamping force exerted onto the hose to be clamped on a pipe socket by means of the clamping screw 2, the loops 9, and the circular clamp portion (main body) 21 of the band 1 for a hose clamp as well as the flap 8 (also called "bridge") is substantially uniformly distributed about the periphery of the hose without the clamping force being greatly different in the areas adjoining the transverse edges 22, 23.

The band for a hose clamp according to FIGS. 7 through 10 differs from that in FIGS. 1 through 4 in that the tabs 17 and the corresponding holes 19 are omitted, wherein the terminal portion 20 of the bent-back leg 11 of the loop 9 tapers in the direction of its free end and is received flush in a concave bead 26. This bead 26 extends in a center plane positioned perpendicularly to the plane of the band 1 for a hose clamp in the vicinity of the holes 18 (not shown in FIG. 7) for the pair of tabs 16. Omitting the tabs 17 and the holes 19 is possible when the band 1 for a hose clamp must not withstand high loading forces. The flush engagement of the terminal portion 20 in the bead 26 (see in particular FIG. 9) prevents also a step-like transition between the free end of the terminal portion 20 and the inner side of the band 1 for a hose clamp.

The band 1 for a hose clamp according to FIGS. 11 to 14 differs from that in FIGS. 7 through 10 in that the bead 26 is omitted and the terminal portion 20 is instead provided with a radially outwardly deformed cup-shaped projection 27 which is guided through a hole 28 in the leg 10, compare FIG. 13, and is secured therein by friction.

Instead of the cup-shaped configuration the projection 26 can also be of a bridge shape in that in the terminal portion 20 two parallel, transversely extending cuts are provided and the stay between the cuts is pressed out of the plane of the end portion.

Instead of only one projection 27 and one hole 28, it is also possible to provide several, for example, two, projections 27 and holes 28, respectively, so that the tabs 16 and the corresponding holes 19 can be omitted also.

The modification of the band 1 for a hose clamp according to FIGS. 15 to 17 differs from that of FIGS. 11 to 14 only in that instead of the cup-shaped projection 27 a substantially nose-shaped projection 29 penetrates the hole 28. In this case, several holes 28 and nose-shaped projections 29 can be provided in the legs 10 and 11 so that in this configuration the tabs 16 and the corresponding holes 18 can also be omitted.

The modification illustrated in FIG. 18 of the band 1 for a hose clamp according to FIGS. 11 through 14 has, instead of the cup-shaped projection 27, a projection in the form of a rim hole 30 in the terminal portion 20 of the bent-back leg 11 of the loop. The rim hole 30 is guided through the hole 28 and is widened at the radially outer end by upending or riveting. In this case, several such rim holes 30 can be provided and introduced into corresponding holes; accordingly, the tabs 16 and the corresponding holes 18 can be omitted.

FIGS. 19 and 20 show a variant of the band 1 for a hose clamp according,to FIGS. 1 through 4 wherein according to FIG. 19 in the not yet deformed terminal portion 20 first U-shaped cuts 31, 32 are formed and the tabs 33, 34 positioned therebetween are then bent upwardly and guided through holes 35 and 36 and finally bent onto the outer side of the leg 10 of the loop in the longitudinal direction of the loop 9, as illustrated in FIG. 20.

FIG. 21 shows a modification of FIGS. 19 and 20 in that the tabs 33 and 34 are first bent at a right angle relative to the plane of the band 1 for a hose clamp, are then guided through the holes 35 and 36, and their free ends are then deformed and widened in the way of a riveting connection.

A further modification resides in that the tabs 16 and/or 17 are not bent in the transverse direction of the band 1 for a hose clamp away from one another but toward one another. However, the configuration according to FIGS. 1 through 6 is preferred where the tabs 16 and 17 are bent so as to point away from one another.

In all configurations it would be possible to employ only projections according to one or several of the embodiments according to FIGS. 15 through 18 instead of the tabs, such as tabs 16, 17, 33, and 34.

While specific embodiments of the invention have been shown and described in detail to illustrate the inventive principles, it will be understood that the invention may be embodied otherwise without departing from such principles.

What is claimed is:

1. A steel band for a hose clamp comprising:
   a main body and at least one pair of end portions and each one of the end portions having at least one slotted hole configured to receive a clamping screw having a screw head;
   the end portions being bent to form loops, each one of the loops having a first leg and a second leg;
   a first clamping member inserted into a first one of the loops and a second clamping member inserted into a second one of the loops;
   the first and second clamping members having a cylindrical shape at least over a peripheral portion thereof;
   wherein the first clamping member has a transverse bore without thread configured to receive a threaded shaft of the clamping screw allowing free movement of the threaded shaft in the transverse bore;
   wherein the second clamping member has a transverse threaded bore configured to engage the threaded shaft of the clamping screw;
   wherein the first leg of the loops has a free end and wherein the first and second legs of the loops are connected to one another near the free end of the first leg;
   wherein the second leg has tabs cut out of the band for a hose clamp and bent out of a plane of the second leg, wherein the first leg has holes and wherein the tabs penetrate the holes and are folded against a side of the first leg facing away from the second leg transverse to a longitudinal direction of the second leg; and
   wherein the tabs are arranged in transverse rows extending in a transverse direction relative to the longitudinal direction of the second leg, wherein the tabs are staggered transversely from one of the transverse rows to the next transverse row, respectively.

2. The band for a hose clamp according to claim 1, wherein the second leg rests against a radially inner side of the circular clamp portion.

3. The band for a hose clamp according to claim 1, wherein a terminal portion of the second leg on which the transverse rows of the tabs are provided is cut stepwise to a reduced width from one of the transverse rows to the next transversely to the longitudinal edges of the band for a hose clamp toward the longitudinal center axis to a base of the tabs such that the band for a hose clamp has transverse edges.

4. The band for a hose clamp according to claim 3, wherein the second leg has at least one pair of the tabs that are bent in opposite directions relative to one another away from a longitudinal center axis of the band for a hose clamp to longitudinal edges of the band for a hose clamp.

5. The band for a hose clamp according to claim 4, wherein the band for a hose clamp has a thickness and wherein the holes in the first leg have a width in a direction transverse to a longitudinal direction of the band for a hose clamp, wherein the width is greater than the thickness of the band for a hose clamp, wherein the tabs of each of the pairs of tabs extend from a base of the tabs at the second leg at a slant relative to a plane of the band for a hose clamp to the side of the first leg facing away from the second leg.

6. The band for a hose clamp according to claim 4, wherein in a center plane of the band for a hose clamp extending perpendicularly to the plane of the band for a hose clamp near the holes of the at least one pair of the holes a concave bead is arranged which extends in a longitudinal direction of the band for a hose clamp, wherein the bead has a hollow space and wherein the terminal portion is bent into the hollow space so as to be arranged flush within the hollow space.

7. The band for a hose clamp according to claim 6, wherein the bead extends between the holes of the at least one pair of the holes and wherein the first leg adjacent to longitudinal sides of the bead projects radially inwardly relative to a contour of the bead and a contour of the band for a hose clamp, wherein at the transverse edges the first leg projects with an amount of projection matching the thickness of the band for a hose clamp and wherein the amount of projection decreases in the longitudinal direction to the contour of the bead and the contour of the band.

8. The band for a hose clamp according to claim 3, wherein the main body ip between the end portions forms a substantially circular clamp portion, wherein the second leg rests against a radially inner side of the circular clamp portion.

* * * * *